(12) United States Patent
Nommensen

(10) Patent No.: US 6,348,137 B1
(45) Date of Patent: Feb. 19, 2002

(54) METHOD AND APPARATUS FOR FRACTIONAL DISTILLATION

(75) Inventor: Arthur Nommensen, Bulimba (AU)

(73) Assignee: IOR Energy Pty Ltd. (AU)

( * ) Notice: Subject to any disclaimer, the term of this patent is extended or adjusted under 35 U.S.C. 154(b) by 0 days.

(21) Appl. No.: 09/462,712

(22) PCT Filed: Jul. 7, 1998

(86) PCT No.: PCT/AU98/00520

§ 371 Date: Jan. 7, 2000

§ 102(e) Date: Jan. 7, 2000

(87) PCT Pub. No.: WO99/02236

PCT Pub. Date: Jan. 21, 1999

(30) Foreign Application Priority Data

Jul. 7, 1997 (AU) .............................................. PO7756

(51) Int. Cl.[7] .............................. B01D 3/14; B01D 3/26; C10G 7/00

(52) U.S. Cl. ..................... 203/49; 196/111; 196/127; 202/158; 203/98; 208/92; 208/362

(58) Field of Search ............................ 203/1.49, 71, 98, 203/DIG. 9; 202/158, 153, 181, 172; 196/127, 126, 132, 111; 208/92, 362, 125, 128, 356

(56) References Cited

U.S. PATENT DOCUMENTS

| | | | | |
|---|---|---|---|---|
| 4,230,533 A | * | 10/1980 | Giroux | 203/98 |
| 4,234,391 A | * | 11/1980 | Seader | 203/100 |
| 4,357,153 A | | 11/1982 | Erickson | |
| 4,482,524 A | * | 11/1984 | Hardrson | 422/170 |
| 5,363,657 A | * | 11/1994 | Naumovitz | 62/39 |
| 5,837,107 A | * | 11/1998 | Watzenberger et al. | 203/78 |
| 5,902,460 A | * | 5/1999 | Gerhold | 203/94 |

FOREIGN PATENT DOCUMENTS

| | | |
|---|---|---|
| EP | A1 0 073 945 | 8/1982 |
| EP | A1 0 140637 | 10/1984 |
| EP | A2 160 553 | 4/1985 |
| EP | A2 0188 387 | 1/1986 |
| EP | 0 755 707 A1 | 6/1996 |
| GB | 2 074 036 A | 4/1981 |
| WO | WO 94/06890 | 3/1994 |

* cited by examiner

*Primary Examiner*—Virginia Manoharan
(74) *Attorney, Agent, or Firm*—Knobbe, Martens, Olson & Bear LLP

(57) ABSTRACT

An apparatus and a method for separating a liquid mixture by fractional distillation. The apparatus includes at least two chambers with a conduit from the lower portion of a chamber which contains liquid to the upper portion of an adjacent chamber, a source of pressurized vapor, and a conduit from the source of pressurized vapor to the lower portion of the chamber which contains liquid. Flow of the liquid from the chamber which contains liquid is effected by introducing pressurized vapor into the liquid, thereby reducing the density of the liquid, pumping the liquid into the upper portion of the adjacent chamber. The two or more chambers can be housed in a single circular vessel, where the chambers are separated by partitions radiating from the center of the cylindrical vessel to the wall of the vessel. The apparatus can have a reduced height compared to conventional distillation columns.

11 Claims, 3 Drawing Sheets

METHOD AND APPARATUS FOR FRACTIONAL DISTILLATION

This is the U.S. national phase under 35 U.S.C. § 371 of International Application No. PCT/AU98/00520, filed Jul. 7, 1998.

FIELD OF THE INVENTION

The present invention relates to a method and apparatus for separating liquids by fractional distillation.

BACKGROUND OF THE INVENTION

The present invention will be described with particular reference to the refining of crude oil. However, the apparatus and method of the present invention may be used to separate liquids from mixtures other than crude oil and no limitation is intended thereby.

Fractional distillation is used to separate liquid mixtures according to the boiling range of the components. In oil refineries crude oil is separated into desired liquid fractions such as diesel, fuel oil and gasoline by fractional distillation. Fractional distillation is typically carried out in a distillation column. The liquid mixture is introduced into the column in vaporised form. The vapour rises against a descending stream of condensed liquid. Packing material such as perforated trays are provided in the column which increase the surface area to allow intimate contact between rising vapour and descending liquid.

A temperature gradient exists between the hotter lower portions of the vessel and the cooler upper portions. This temperature gradient may also be facilitated by introducing a cooling liquid to the upper portion of the column. A liquid/vapour equilibrium is present at each level of the column. At points in the column at which the temperature corresponds to the temperature of a desired product liquid is drawn from the tower. Since light products must pass through heavier products before reaching the relevant drawoff point, liquids which are drawn off at intermediate points in the column invariably contain such lighter products. These lighter products must consequently be removed by stripping.

In order to obtain effective separation, distillation columns must be quite high and are typically about 20 to 80 metres. The columns must be constructed so as to resist wind loads and forces generated by earthquakes. This adds considerably to the cost. There is also a safety risk in providing personnel access to the higher parts of the column as is required for regular maintenance. Still further, it is often desirable to refine crude oil on sites adjacent ocean oil platforms. On fixed oil or gas platforms, the height of a conventional column may represent a hazard for on-board cranes and service helicopters. When high columns are mounted to sea going vessels they are subject to large forces and horizontal position shift induced by the vessels roll and pitch. This movement disturbs the mix of the vapour and liquid streams and reduces the efficiency of the separation.

It is therefore desirable to be able to provide a column for fractional distillation which has a reduced height. This has been accomplished in the past by providing a number of separate columns connected in series. In order to provide the necessary counter flow of rising vapour and descending liquid such systems pump hot liquid from the bottom of one column to the top of the previous column. Additionally vapour from the top of one column must be passed to the bottom of the next column. This flow of liquid and vapour between columns requires extensive piping and pumping equipment. Further, the liquid and vapour which are transferred between columns are very hot. This requires the use of high temperature pumping equipment.

It is therefore an object of the present invention to provide a method and apparatus for fractional distillation which may at least partially overcome the above disadvantages or provide the public with a useful choice.

DISCLOSURE OF THE INVENTION

According to a first broad form of the invention there is provided an apparatus for separating a liquid mixture by fractional distillation, the apparatus including at least two chambers which are in vapour and fluid communication and liquid flows from the lower portion of one chamber to the upper portion of an adjacent chamber, wherein said flow of liquid to the adjacent chamber is effected by introducing a pressurised vapour into the liquid.

According to a second broad form of the invention there is provided a method of transferring liquid between chambers in a fractional distillation apparatus, said transfer being from the lower portion of one said chamber to an upper portion of an adjacent said chamber, the method including introducing a pressurised vapour into the liquid so as to effect said transfer.

The apparatus of the present invention may be used to distil any suitable mixture and is particularly suitable for the distillation of crude oil.

The apparatus includes two or more chambers which are in liquid and vapour communication. Therefore, in use there is a transfer of vapour and liquid between chambers. This produces an upflow of vapour and a downflow of liquid in any one chamber.

The mixture to be separated is typically introduced into a first chamber as a vapour. The apparatus includes two or more chambers. Typically, a coolant liquid is introduced into the final chamber. This produces a desired temperature gradient throughout the apparatus. Additional cooling may be provided by introducing a liquid into an upper portion of individual chambers. A similar addition of liquid is employed at selected heights in tower distillation columns. This is known as a side reflux. Typically, the introduced liquids are the same liquids as those which are being withdrawn at that particular height of a single column or from that particular chamber in the apparatus of the present invention.

As in the known single columns, when the temperature corresponds to the temperature of a desired liquid fraction, that liquid fraction is drawn off. In the apparatus of the present invention, a desired liquid fraction is typically drawn off from a lower portion of a respective chamber. Thus, the number of chambers typically corresponds to the number of desired liquid fractions. A typical apparatus for distilling crude oil would include three chambers. The liquid products withdrawn from the respective chambers being fuel oil, diesel and jet fuel.

The liquid is caused to flow between a lower portion of one chamber to an upper portion of an adjacent chamber by the introduction of a pressurised vapour. Typically, the vapour is introduced into the liquid in the lower part of the chamber. The pressurised vapour produces a two phase mixture of gas and liquid. When this occurs in a confined space, the density of the liquid is reduced. This principle is known as the Pohle air lift. In the present invention the effect of the Pohle air lift is to pump liquid from the lower portion of one chamber towards or to an upper portion of a previous chamber. Vapour flows in the reverse direction from the upper portion of one chamber to the lower portion of the next chamber.

In a preferred embodiment of the present invention the pressurised vapour is injected into the system. The vapour may be injected by using a jet injector pump with a venturi nozzle. Such pumps are known. The vapour is introduced at a high velocity. The kinetic energy from the injected vapour assists in forcing the liquid to the upper portion of the previous chamber.

The use of an injection pump may assist the action of the Pohle air lift in pumping the liquid. Such assistance may allow chambers of a greater height to be used. Further, in some cases, a relatively large amount of vapour necessary to be introduced to the liquid to create the Pohle air lift may be required. This may be undesirable, particularly when the vapour is a distillation product. Introducing the vapour by using an injection pump or similar device may enable the amount of vapour to be reduced.

In an alternative embodiment of the present invention, the vapour may be introduced into the upper portion of the flow of liquid to the previous chamber. Introduction of the vapour reduces the pressure and effectively creates a vacuum in the upper portion of the liquid flow. This vacuum draws the liquid upwards. Injection of vapour into the upper portion of the liquid flow may be used on its own or in addition to introducing the vapour into the lower liquid level.

The pressurised vapour which is introduced to the liquid may be any suitable vapour. The vapour may be a revaporised by-product of the distillation such as vaporised naptha. Alternatively, an inert vapour such as steam may be used. In the event that steam or other inert vapour is used then the use of a surplus lift pump capacity, with a portion of the "lifted" product allowed to recycle back to the source segment bottom, will give rise to a "stripping" action and remove the small quantities of entrained light product in the withdrawn product from the segment. This may avoid the use of separate external "stripper" vessels conventionally employed for this purpose.

The chambers may be arranged in any suitable configuration. The chambers may be discrete units connected by pipes for transfer of vapour and liquid. Preferably, the chambers are housed in a single vessel. In a preferred embodiment of the invention the apparatus includes a vessel of circular cross section in which the chambers are separated by radial partitions. Alternatively, the chambers may be in the form of discrete units housed within the single vessel. This allows the chambers to be manufactured independently and then installed into the single vessel. It will also be appreciated that such an arrangement does not require the individual chambers to be able to withstand internal pressures. The outer vessel, only, is required to be able to operate under pressure. The vessel is typically of circular cross section which optimises the internal pressures it can withstand. The apparatus includes conduits or subchambers for the transfer of fluids and vapour. Preferably, the partitions are constructed of a material to minimise heat transfer between chambers. Preferably the vessel partitions are therefore constructed of stainless steel.

By way of Example only, the present invention will be described by reference to the following Figures in which;

BEST MODE

The Figures illustrate a preferred apparatus for the distillation of crude oil.

Figure 1:
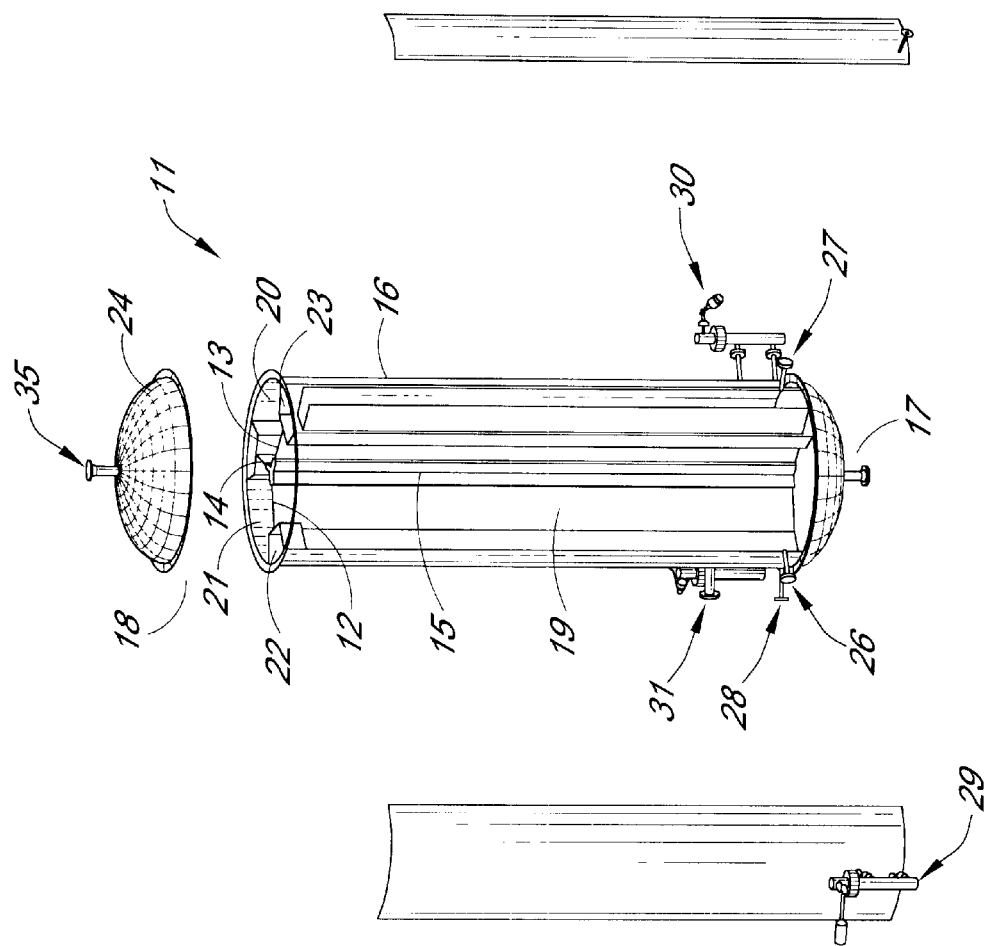
FIG. 1 illustrates a schematic segmented view of a preferred apparatus of the present invention.

FIG. 1 illustrates a preferred fractional distillation apparatus 11 of the present invention. The apparatus is in the form of a cylindrical vessel. The vessel has three walls 12, 13, 14 radiating from the centre 15 towards the circumference 16 of the cylinder. The walls extend from the bottom 17 to the top 18 of the vessel so as to divide the vessel into three internal chambers 19, 20, 21. Wall 14 terminates against circumference 16. Two further subsidiary chambers 22, 23 are located adjacent circumference 16. Walls 12 and 13 abut chambers 22 and 23 respectively. The lower portion of each chamber 19, 20, 21 is provided with a vapour inlet 26, 27, 28 and liquid outlet 29, 30, 31. The chambers are also provided with packing or trays (not illustrated) as known in the art. Also, because of the non-uniform cross section of the chambers it may be necessary to include liquid redistributor channel plates. Inlet 26 which is located in chamber 19 is adapted to receive the mixture in a substantially vaporised form. The liquid outlets are for drawing off separated liquid which condenses in the lower portion of the chamber. Inlets 27 and 28 are adapted to receive a pressurised vapour and will be described in greater detail below.

The vessel also includes conduits 40, 41 located at the centre 15 of the vessel. These chambers bridge walls 12, 13, 14 and have apertures which allow passage of vapour between chambers 19, 20, 21. This is illustrated schematically in FIG. 2 and will be described in greater detail below.

The vessel has a cover 20. The cover seals against the top of chambers 12, 13. Chamber 14 is not sealed such that vapour from chamber 13 is allowed to escape through outlet 35 in cover 20.

Figure 2:
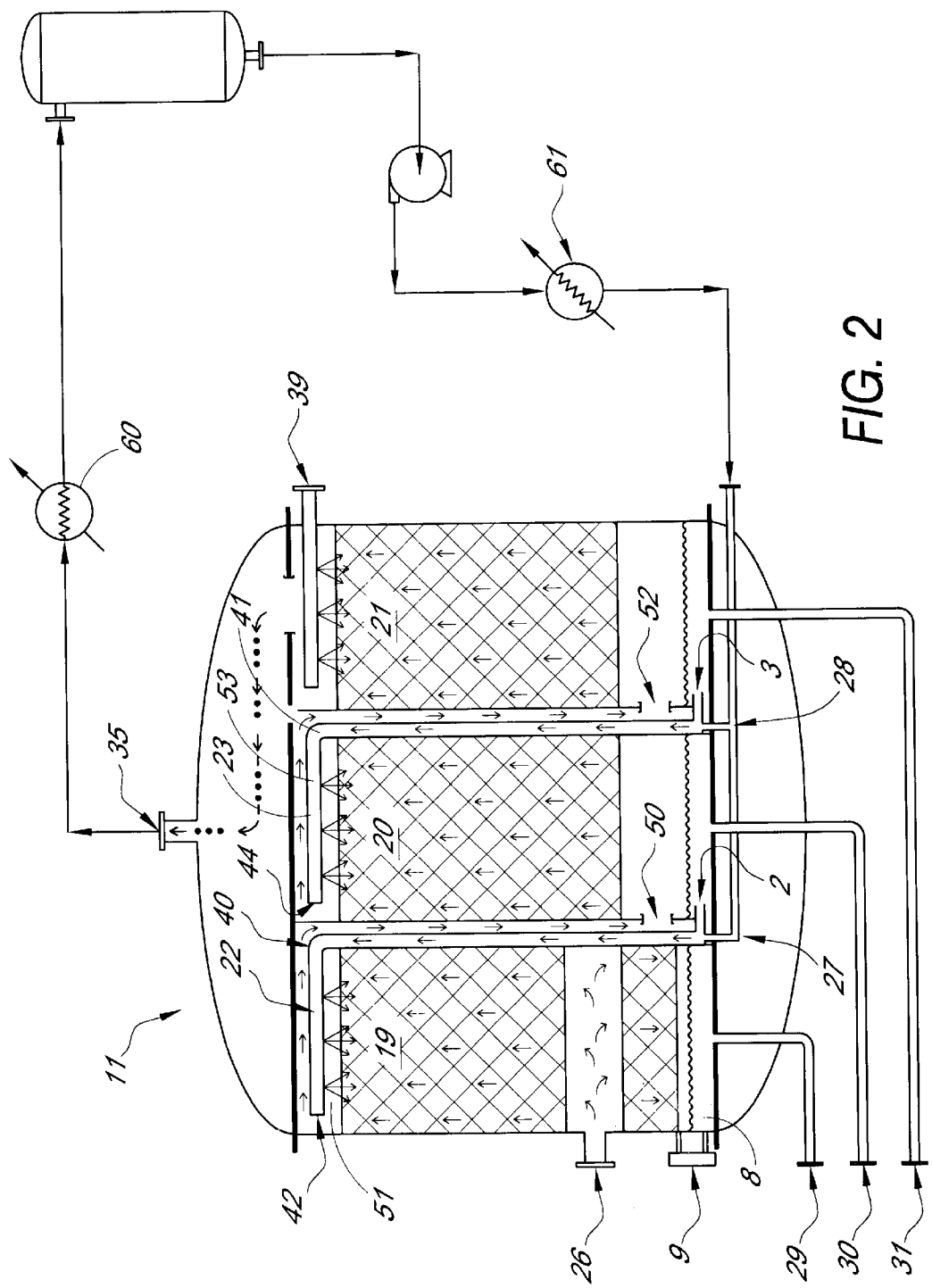
FIG. 2 illustrates a schematic open view of the apparatus of FIG. 1.
Figure 3:
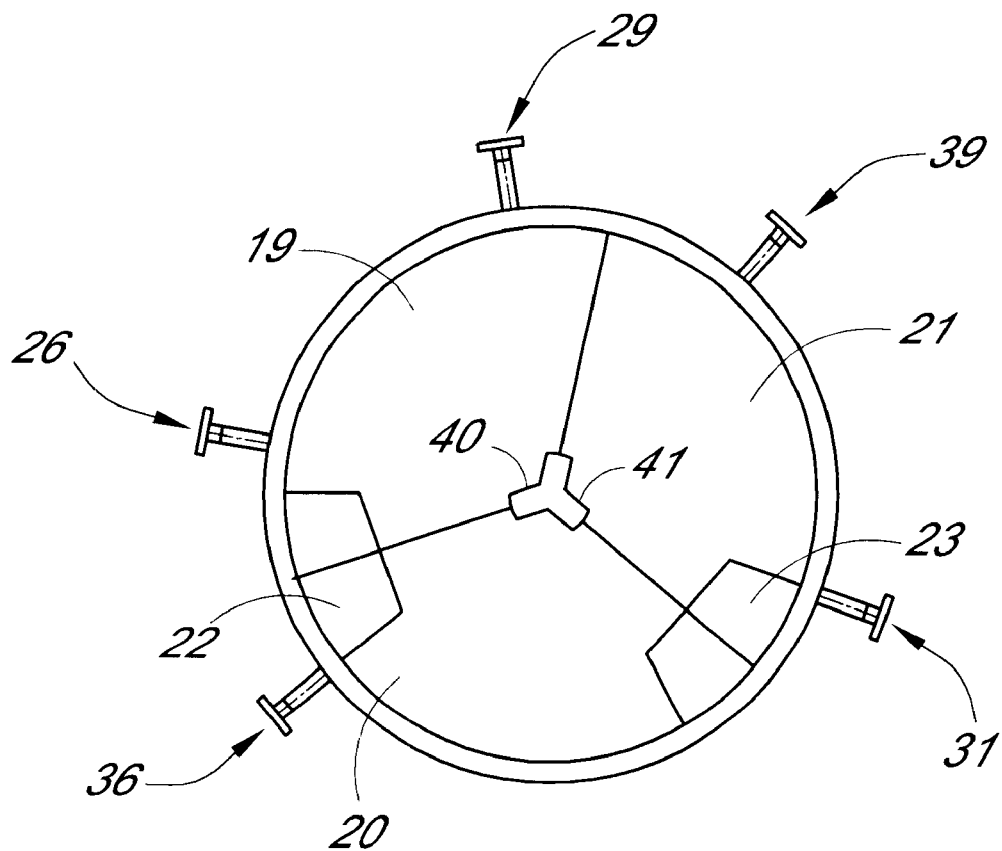
FIG. 3 is a cross section of the apparatus illustrated in FIG. 1.

FIG. 2 illustrates a schematic view of the flow of vapour and liquid through the apparatus. Crude vapour is introduced through inlet 26 into the lower portion of chamber 19. A coolant liquid is introduced into chamber 21 through inlet 39. This creates a temperature gradient between the chambers.

Within the first chamber 19 there is an upflow of crude vapour and downflow of condensed liquid. Fuel oil which has the highest boiling point collects in the lower portion 8 of chamber 26 and may be drawn off through outlet 29. A fluid level control 9 is located in the lower portion of chamber 19.

The flow of vapour between the chambers 19, 20, 21 occurs by passage through conduits 40, 41. Conduit 40 has a vapour inlet 42 located in the upper portion of chamber 19 and an outlet 50 located in the lower portion of chamber 20. A similar vapour inlet 44 and outlet 52 are located in chambers 20 and 21. These conduits enable vapour to pass from the upper portion of one chamber into the lower portion of the next chamber. The vapour introduced in the lower portion of the column then rises through a downflow of liquid. It can be seen from reference to FIG. 2 that vapour is introduced at a level above that of liquid collected in the lower portion of the vessel and is to be withdrawn. In normal tower columns the products are not in complete equilibrium because vapour must pass through the zone at which other products are withdrawn. This necessitates stripping of the product. In the present apparatus the liquids are withdrawn from the lower portion of a respective chamber which is below the level at which vapour is introduced. This reduces entrapment of vapour impurities into the liquid prior to withdrawal.

The apparatus 11 includes subsidiary chambers 22, 23 as described above. These chambers allow the flow of liquid between chambers as illustrated schematically in FIG. 2. Subsidiary chamber 22 has a liquid inlet 2 located in the lower portion of chamber 20 and a liquid outlet 51 located in the upper portion of chamber 19. Similarly subsidiary chamber 23 has a liquid inlet 3 located in the lower portion of chamber 21 and a liquid outlet 53 located in the upper portion of chamber 20. The apparatus has vapour inlets 27, 28 for introducing a pressurized vapour into the lower portion of chambers 20 and 21. The vapour inlets 27, 28 may simply introduce vapour into the liquid so as to reduce the density of liquid in the lower portion of the subsidiary chamber and the difference in hydrostatic pressure drives the lower density of liquids up through respective subsidiary chambers 22, 23. The liquid is then dispersed into the upper portion of chambers 19, 20 and flows downwards against an upflow of vapour. The vapour which is introduced is gasoline vapour recycled from outlet 35 by passing through a series of condensers 60 and vapouriser 61. Vapourisation may occur by heat exchange with the hot products from the apparatus.

Preferably the vapour may be injected at high velocity. Suitable injector devices are known and are typically associated with an injection pump or jet pump (not illustrated). Typically, the vapour is introduced by a venturi nozzle. The kinetic energy of the vapour injected at high velocity forces the liquid from the lower portions of chambers 20, 21 to the upper portions of the previous chambers.

The vapour from inlets 27, 28 is introduced into the liquid in the lower portion of chambers 20, 21. It is preferred that the apparatus includes means for maintaining the level of this fluid at a desired level.

It can be seen that the fractional distillation apparatus of the present invention can be constructed on a much smaller scale than a conventional single tower column. A typical apparatus of the present invention may be about 6 to 8 metres in height as compared to 60 to 80 metres for conventional columns. The apparatus of the present invention also avoids the use of complicated and expensive hot pumping equipment and pumping systems.

What is claimed is:

1. An apparatus for separating a liquid mixture by fractional distillation, the apparatus comprising:

at least two chambers which are in vapour and liquid communication;

at least one conduit extending between a lower portion of a first chamber containing liquid to an upper portion of an adjacent chamber, for allowing liquid to flow from said lower portion to said upper portion, said at least one conduit having a pressurised vapour inlet;

means for introducing a pressurized vapour from at least one source of pressurized vapour into the liquid flow in said at least one conduit, such that the flow of liquid through said at least one conduit from said lower portion of said first chamber to said upper portion of the adjacent chamber is effected.

2. The apparatus of claim 1 wherein the at least two chambers are housed in a single vessel.

3. The apparatus of claim 2 wherein the single vessel is of circular cross section and the chambers are separated by radial portions.

4. The apparatus of claim 2, wherein the chambers are in the form of discrete units housed within the single vessel.

5. The apparatus of claim 1 wherein the pressurized vapour inlet is located in lower portion of said conduit.

6. The apparatus of claim 5 which comprises an injector for injecting the pressurized vapour into the conduit.

7. The apparatus of claim 5 wherein which includes means for maintaining the liquid at a desired level.

8. The apparatus of claim 1 wherein the vapor is a vaporized product of the distillation.

9. A method of transfer liquid between chambers; in a fractional distillation apparatus, said transfer being from the lower portion of one said chamber to an upper portion of an adjacent said chamber, through a conduit connecting said lower portion of said first chamber with said upper portion of said adjacent chamber, the method including introducing a pressurised vapour into the conduit so as to effect said transfer.

10. The method of claim 9, wherein the pressurized vapour is introduced into the lower portion of the conduit.

11. The method of claim 9, wherein the pressurized vapor is a vaporized product of the distillation.

* * * * *